United States Patent [19]

Horvath

[11] Patent Number: 4,670,990

[45] Date of Patent: Jun. 9, 1987

[54] MARKING GAUGE FOR LOCATING POSITIONS INDICATIVE OF CONSTRUCTION PATTERNS OF COMPONENTS OF ARTICLES OF FURNITURE

[75] Inventor: Glenn Horvath, Martinsville, N.J.

[73] Assignee: Julius Blum Gesellschaft m.b.H., Höchst, Austria

[21] Appl. No.: 844,015

[22] Filed: Mar. 26, 1986

[51] Int. Cl.$^4$ .......................... G01B 5/00; G01B 5/14

[52] U.S. Cl. ....................................... 33/562; 33/485; 33/666

[58] Field of Search ................ 33/1 G, 189, 197, 484, 33/485, 486, 487, 562

[56] References Cited

U.S. PATENT DOCUMENTS

| | | | |
|---|---|---|---|
| 861,799 | 7/1907 | Breil | 33/494 |
| 911,608 | 2/1909 | Pullen | 33/189 |
| 1,334,145 | 3/1920 | Eaton | 33/483 |
| 1,400,898 | 12/1921 | Murdock | 33/197 |
| 1,545,424 | 7/1925 | Heimrich | 33/189 |
| 1,594,862 | 8/1926 | Unverferth | 33/494 |
| 1,677,821 | 7/1928 | Graham | 33/494 |
| 1,693,227 | 11/1928 | Ellis | 33/494 |
| 2,548,197 | 4/1951 | Conner | 33/562 |
| 2,592,877 | 4/1952 | Ellington | 33/189 |
| 2,624,944 | 1/1953 | Pujda | 33/26 |
| 2,647,325 | 8/1953 | Little | 33/197 |
| 2,713,203 | 7/1955 | Gottlieb | 33/1 |
| 2,799,938 | 7/1957 | Anderson | 33/107 |
| 2,904,891 | 9/1959 | Cook | 33/111 |
| 3,039,199 | 6/1962 | Maag | 33/189 |
| 3,135,464 | 6/1964 | Quesenberry, Jr. | 235/70 |
| 3,183,596 | 5/1965 | Shaw | 33/90 |
| 3,242,578 | 3/1966 | Moll | 33/189 |
| 3,246,399 | 4/1966 | Southern | 33/189 |
| 3,284,911 | 11/1966 | Clark | 33/189 |
| 3,775,857 | 12/1973 | Handy | 33/189 |
| 4,035,099 | 7/1977 | Friederichs et al. | 408/103 |
| 4,270,276 | 6/1961 | Skura | 33/189 |
| 4,499,666 | 2/1985 | Smith | 33/494 |
| 4,527,337 | 7/1985 | Dreiling | 33/562 |

FOREIGN PATENT DOCUMENTS

| | | | |
|---|---|---|---|
| 1259697 | 3/1961 | France | 33/484 |

*Primary Examiner*—Richard R. Stearns
*Attorney, Agent, or Firm*—Wenderoth, Lind & Ponack

[57] ABSTRACT

A marking gauge employed for locating positions indicative of construction patterns of components of articles of furniture includes an elongated ruler positionable at a location representative of a component of an article of furniture on which is to be mounted at least one furniture fitting, and a plurality of templates which are representative of the respective furniture fittings. The templates are adjustably mounted along the ruler at predetermined different locations. Each template has structure for, when such template is mounted at a selected predetermined location along the ruler, locating a position indicative of a predetermined construction pattern of a component of the article of furniture.

18 Claims, 11 Drawing Figures

1
2
3
5
6
7
7'
9
9'
10
10'
10''
12
13
14
15
16
18
19
20
32

MARKING GAUGE FOR LOCATING POSITIONS INDICATIVE OF CONSTRUCTION PATTERNS OF COMPONENTS OF ARTICLES OF FURNITURE

BACKGROUND OF THE INVENTION

The present invention relates to a marking gauge for use in the furniture industry for locating positions indicative of construction patterns of components of articles of furniture.

More particularly, the present invention relates to such a gauge which makes it possible to set positions of machine stops for boring and cutting machinery employed for manufacturing components of articles of furniture. Further particularly, the present invention relates to such a gauge which makes it possible to determine or mark positions of various furniture fittings such as hinge mounting plates, supporting rails for telescopic drawer fittings and furniture connection pieces, for example for use in mounting furniture shelves, and the like. In accordance with one aspect of the present invention, the gauge of the present invention is employed for determining or marking such positions to set the various guides and stops of furniture component manufacturing machinery to enable the furniture components to be cut, machined, bored and assembled according to a predetermined construction pattern. In accordance with a further aspect of the present invention, the gauge of the present invention is employable for the mounting of the various furniture fittings on side walls of articles of furniture.

Thus, in the manufacture of articles of furniture, it is a tedious and somewhat time consuming operation to measure, calculate and mark positions at which furniture fittings are to be attached and to calculate and determine the settings of guides and stops of boring and cutting machinery employed for the manufacture of the components of the articles of furniture.

Furthermore, there exists in the present American woodworking industry, especially in smaller cabinet shops, confusion as to the correct location of various holes to be bored in the furniture components and how they relate to one another in determining what size cabinet components can be made, particular drawer size and location, etc.

SUMMARY OF THE INVENTION

Accordingly, it is an object of the present invention to provide a marking gauge which simplifies substantially the operation of locating positions indicative of construction patterns of components of articles of furniture.

It is a more specific object of the present invention to provide such a marking gauge which may be employed to set positions of machine stops for boring and cutting machinery employed for manufacturing components of articles of furniture.

It is a still further object of the present invention to provide such a marking gauge which may be employed for locating positions of attachment of furniture fittings on articles of furniture.

It is a yet further object of the present invention to provide such a marking gauge which is adaptable to different types of furniture fittings and to different sizes and styles of articles of furniture.

These and other objects of the present invention are achieved in accordance with the present invention by the provision of a marking gauge including an elongated ruler which is capable of being located at a position representative of a component of an article of furniture onto which is to be mounted at least one furniture fitting. At least one template representative of the furniture fitting is adjustably mounted on the ruler to be movable therealong to predetermined different locations. The template has means for, when the template is mounted at a selected predetermined location along the ruler, determining a position indicative of a predetermined construction pattern of a component of the article of furniture. Thus, the marking gauge according to the present invention may be employed to allow a cabinet or furniture designer to layout and size all cabinet or furniture components before any cutting or boring machinery is set. These decisions may be made in advance at management level and once established the gauge on which such decisions or determinations have been made can be transferred to a less experienced person who then can transfer the information to set various machine guides and stops and thereafter to accomplish cutting, machining, boring and finally assembly of the cabinet or furniture article. Particularly, the marking gauge of the present invention enables such operations to be achieved to provide machinery settings to enable furniture articles to be bored at predetermined locations such that after the article of furniture is assembled various furniture fittings may be mounted therein by use of such bored holes. Furthermore, the marking gauge of the present invention may be employed to locate positions of attachment of furniture fittings on already assembled articles of furniture.

Preferably, the ruler has therealong at least one scale, and preferably both English and metric scales.

Further preferably, the ruler has therealong plural templates representative of respective different types of furniture fittings to be mounted on an article of furniture, such that the templates represent a complete drilling pattern for drilling holes to mount the various furniture fittings and to enable the complete drilling pattern of a boring machine to be set. The templates preferably provide an overall visual indication of the relative positions of the furniture fittings after attachment.

BRIEF DESCRIPTION OF THE DRAWINGS

Other objects, features and advantages of the present invention will be apparent from a consideration of the following detailed description of preferred embodiments thereof, with reference to the accompanying drawings, wherein.

DETAILED DESCRIPTION OF THE INVENTION

In the following description reference is made to employing the marking gauge of the present invention along a side wall of an article of furniture and marking such side wall to indicate positions of attachment of various furniture fittings. It is to be understood however that this description merely is representative of the fields of use of the present invention and that the scope of the present invention is not intended to be limited to such description. Thus, it particularly is contemplated that the marking gauge of the present invention may be employed as indicated above to set various guides and stops of cutting and boring machinery prior to cutting and boring operations involved in the manufacture of furniture components which later are assembled to form articles of furniture.

Figure 1:
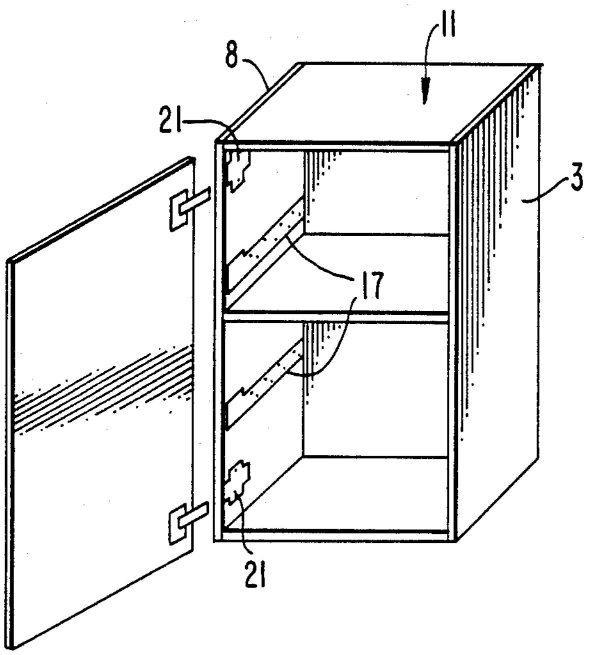
FIG. 1 is a perspective view of an article of furniture provided with various types of known furniture fittings.

In FIG. 1 is shown an article of furniture, for example a cabinet, having spaced side walls 8, a top wall 11 and a bottom wall. The article of furniture further has a door which is to be hinged to one side wall 8 by means of hinges including respective hinge mounting plates 21. The article of furniture further includes a horizontal shelf dividing the interior of the cabinet into upper and lower chambers each of which is intended to house a drawer supported by telescopic fittings including supporting rails 17.

Figure 2:
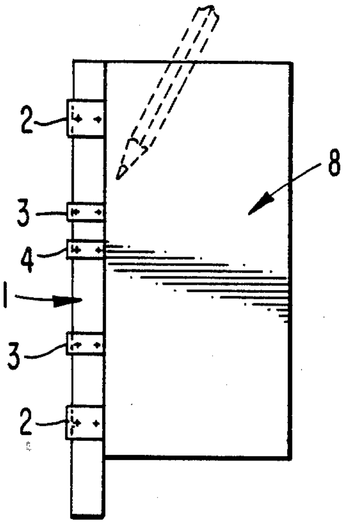
FIG. 2 is a schematic plan view of a marking gauge according to the present invention employed for locating positions of attachment of the furniture fittings shown in FIG. 1 on a side wall of the article of furniture shown therein.

The marking gauge of the present invention, shown schematically in FIG. 2, makes it possible to locate positions of attachment of all of the furniture fittings employed in the article of furniture shown in FIG. 1. Specifically, the marking gauge includes an elongated ruler 1 and a plurality of templates including upper and lower templates 2 for locating positions of attachment of hinge mounting plates 21, upper and lower templates 3 for locating positions of attachment of supporting rails 17, and a centrally located template 4 for locating a position of attachment of a furniture connection piece (not shown but intended to be conventional) for mounting the shelf shown in FIG. 1. Particularly, templates 2–4 make it possible to locate the positions for drilling holes in side wall 8 to thereafter mount the respective furniture fittings. Further, the relative locations of such templates may be employed as indicated above to set various machine guides and stops of cutting and boring machinery which thereafter are employed for forming components of articles of furniture according to a predetermined construction pattern established by the marking gauge.

It is to be understood that the article of furniture shown in FIG. 1 and the respective furniture fittings thereof described above are intended to be exemplary of the present invention only and not restrictive of the scope thereof. Thus, the marking gauge of the present invention can be modified to include other arrangements of templates than specifically shown and also can incorporate different types of templates for mounting different types of known furniture fittings. It is believed that such possible variations and modifications would be apparent to one skilled in the art.

As will be apparent from a consideration of FIGS. 5–11, templates 2–4 which are illustrated and which will be described in more detail below specifically are formed for particular respective furniture fittings.

Figures 3, 4:
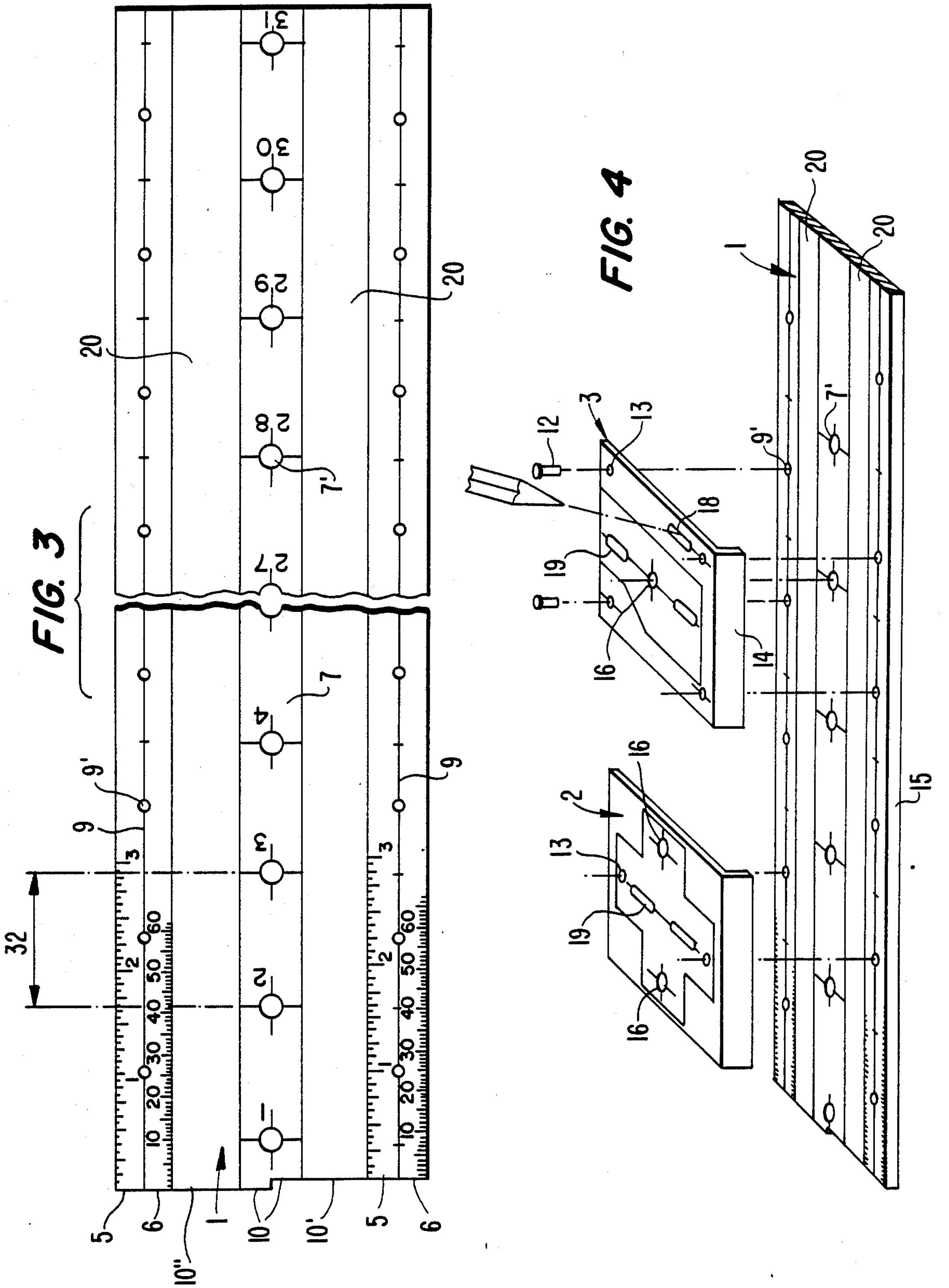
FIG. 3 is a plan view of a ruler which forms a portion of the marking gauge of the present invention.
FIG. 4 is a perspective exploded view of the ruler of FIG. 3 and the relationship therewith of two templates shown in FIG. 2 and employed with the ruler to form the marking gauge of the present invention.

As shown in FIG. 3, ruler 1 has along each of the side edges thereof a respective inch or English scale 5 and a respective metric scale 6 to enable a user to layout the work in either inches or millimeters and then to visually compare the relationship of English and metric sizes. Positioned centrally of ruler 1 is a series 7 of marking holes 7' which extend longitudinally of the ruler and which are spaced at predetermined equal intervals, for example intervals of 32 mm as indicated by the spacing between the second and third holes 7' from the left as shown in FIG. 3. This spacing corresponds to the currently most commonly employed system for drilling holes in side walls of an article of furniture for mounting fittings therein. Thus, conventionally furniture fitting attachment holes are spaced from each other by intervals which are multiples of 32 mm. It of course is to be understood that the specific dimension is not intended to be limiting of the present invention. Rather, marking holes 7' simply are spaced at equal predetermined intervals corresponding to a standard grid employed in the industry, e.g. as employed on European dowel and line boring machinery.

Along each of the opposite sides of ruler 1 are formed series 9 of mounting holes 9' employed for adjustably positioning templates 2–4 along the length of ruler 1. Mounting holes 9' also are spaced at the predetermined equal interval along the ruler but are offset with respect to marking holes 7'. Particularly, mounting holes 9' are positioned midway between adjacent marking holes 7' in the longitudinal direction of the ruler.

Pins 12 extend through respective holes 13 in templates 2–4 and fit into respective mounting holes 9'. Thus, it is possible to adjustably mount each template at predetermined different locations along ruler 1.

Each template includes means for, when such template is mounted at a selected predetermined location along the length of ruler 1, locating a position of attachment of the respective furniture fitting to the article of furniture. Thus, when ruler 1 is located, in a manner to be discussed below, with respect to side wall 8, and when templates 2–4 are positioned along ruler 1 at respective selected predetermined locations, then such positions of the templates are representative of intended positions of the respective furniture fittings. Further, when the templates are positioned along ruler 1 at respective selected predetermined locations, then the intended positions of respective furniture fittings representative of such positions of the templates may be employed for setting machine guides and stops for boring equipment for use in manufacturing the respective furniture components.

More particularly, each template has therethrough at least one hole 16 indicative of the position to be drilled in side wall 8 to mount the respective furniture fitting. Further, holes 16 in the respective templates are located at positions therein to be aligned with respective marking holes 7' when the templates are mounted at selected predetermined locations along the ruler. In other words, when a given template is mounted at a selected predetermined location along ruler 1, by means of pins 12 fitting through holes 13 into mounting holes 9', then the hole or holes 16 in such respective template will be aligned with a respective marking hole or holes 7' in ruler 1. This relationship is shown in FIG. 4 of the drawings. It therefore will be possible for the operator simply to extend a marking device through aligned holes 16, 7' to mark on side wall 8 to indicate a position where a hole is to be drilled for attachment of the respective furniture fitting. Furthermore, such aligned holes make it possible to mark on a markable surface of the gauge itself an indication which then may be used as indicated above to establish settings of various guides and stops of boring machinery.

FIG. 3 illustrates a further feature of the present invention whereby it is possible to orient ruler 1 with respect to side wall 8 when the top wall 11 of the article of furniture is intended to have different thicknesses. Thus, it currently is conventional in the industry to employ top walls 11 of different thicknesses, specifically 16 mm and 19 mm. One end of the ruler 1 is defined by a step 10 including two parallel surfaces 10', 10" offset from each other axially of the ruler. If the article of furniture is to include a top 11 having a thickness of 16 mm, then edge 10' is placed flush with the upper edge of side wall 8 to orient the ruler 1. On the other hand, if the article of furniture is to include a top wall 11 having a thickness of 19 mm, then edge 10" is positioned flush with the upper edge of side wall 8 to orient ruler 1. After the appropriate orientation of ruler 1, then templates 2–4 are moved along ruler 1 to selected positions thereof representative of the particular pattern of furniture fittings to be attached to side wall 8, in the manner discussed above.

As particularly will be apparent from the schematic illustration of FIG. 2, once the templates are located according to a predetermined pattern, then the entire drilling pattern for side wall 8 will be visually apparent to the operator or assembler. Thus, the operator will be able to see at once whether the various templates are positioned incorrectly, for example too close to each other or too far apart from each other.

Figure 5:
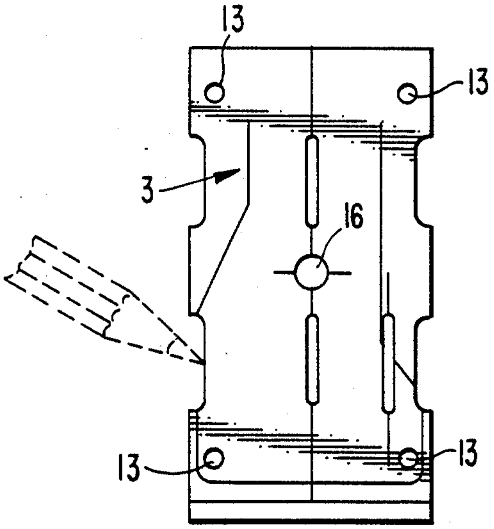
FIG. 5 is a plan view of a first template.
Figure 6:
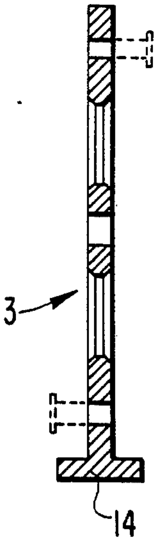
FIG. 6 is a transverse cross section thereof.
Figure 8:
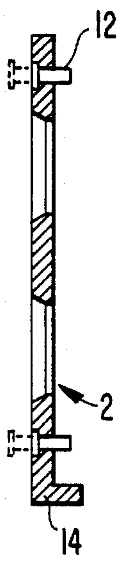
FIG. 8 is a transverse cross section thereof.
Figure 7:
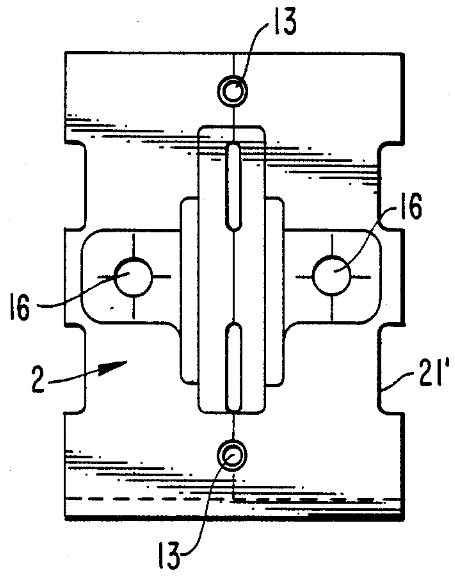
FIG. 7 is a plan view of a second template.
Figure 9:
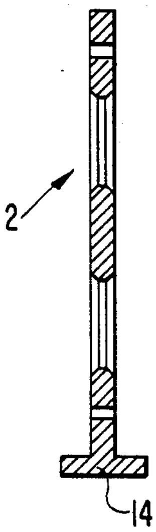
FIG. 9 is a view similar to FIG. 8 but of a modification thereof.
Figure 10:
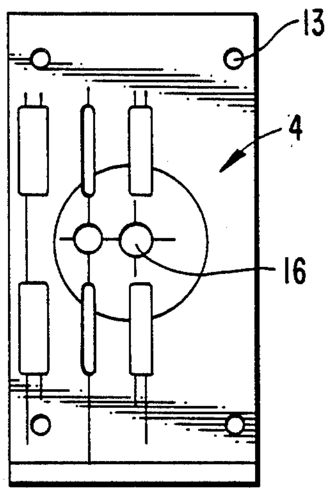
FIG. 10 is a plan view of a third template.
Figure 11:
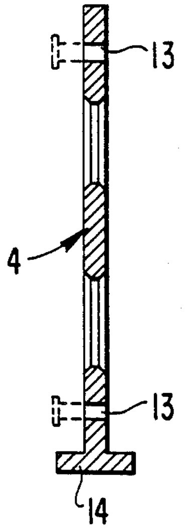
FIG. 11 is a transverse cross section thereof.

The particular templates 2–4 are shown in more detail in FIGS. 5–11. Thus, FIGS. 5 and 6 illustrate a template 3 employed for locating a position of attachment of a supporting rail 17 shown in FIG. 1. FIGS. 7–9 illustrate a template 2 employed for locating a position of attachment of a hinge mounting plate 21 shown in FIG. 1. FIGS. 10 and 11 illustrate a template 4 which may be employed for locating a position of attachment of a furniture connection piece used to mount the shelf shown in FIG. 1. Again, it is to be understood that these specific templates are exemplary of the present invention but that the present invention is not intended to be specifically limited to such template structures.

Each template 2–4 may be provided with a flange 14 which may be used to contact an edge 15 of ruler 1, thereby forming a guide structure. Attention is directed to the fact that the fittings representative of templates 2 and 4 are symmetrical, and therefore the edge flanges 14 may extend from only a single side thereof, as shown in FIG. 8 with regard to template 2. However, the supporting rail 17 represented by template 3 of FIG. 5 is not symmetrical. In other words, the supporting rail 17 shown in FIG. 1 is mounted on the left side wall. The supporting rail to be mounted on the right side wall of the article of furniture is not symmetrical, but rather is a mirror image of the left side wall supporting rail. Therefore, the template 3 used to locate the position of attachment of the left side wall supporting rail cannot be used in the same orientation to locate the position of attachment of the right side wall supporting rail. Accordingly, template 3, to be employable to locate the positions of attachment of both the left side wall and right side wall supporting rails, must have edge flanges 14 extending in opposite directions, as shown in FIG. 6. This feature can be incorporated into the synmmetrical templates 2 and 4, as shown in FIGS. 9 and 11, respectively.

In accordance with a further feature of the present invention, the templates 2–4 may be provided with outlines of the respective furniture fittings, or at least portions thereof. This is shown in FIGS. 5, 7 and 10. This arrangement has the advantage of providing an accurate visual impression to the operator of the final positions of the respective furniture fittings.

In accordance with a further feature of the present invention, the templates 2–4 may have therethrough various slots 18, 19 for indicating, and possibly marking, the locations of portions of the respective furniture fittings to be mounted. Thus, the operator may mark a position through a slot 18 or 19 indicative of the position of a portion of the respective furniture fitting. This template then may be moved to another spot along the ruler, with the previous marking remaining. For example, slots 19 shown in FIG. 4 represent center positions of the respective furniture fittings. Similarly, slot 18 represents the lower edge of a drawer to be supported by supporting rail 17. Thus, the operator can mark, not only the position of a hole to be drilled for attaching the supporting rail, but also the position where the bottom of a drawer to be supported by the supporting rail. The operator then can precisely designate the extent on ruler 1, by which a front drawer panel should extend downwardly below the drawer bottom. Starting from such determination, the operator then can determine the position of the next fitting.

FIGS. 5 and 7 further indicate an additional feature of the present invention, wherein upper and lower edges of the templates may be provided with recesses 21' to be used to mark positions of portions of the respective fittings.

To facilitate the above markings by use of slots 19, 18 and recesses 21', ruler 1 may be provided with a pair of longitudinally extending marking or inscription strips 20. Thus, the above discussed markings can be made on strips 20, thereby leaving a record of first positions of the templates if the templates are to be moved to new positions.

In accordance with a further feature of the present invention, shown particularly in FIG. 3, the marking holes 7' are numbered consecutively from one end of the ruler 1 to the other. Since the holes 7' are spaced by predetermined equal intervals, corresponding to a particular industry grid or scale, the consecutive numbering of the holes 7' makes it possible for a production order to be written based on such numbered hole locations and then sent to an operator or assembler at a different location. In other words, this allows for more efficient production. This consecutive numbering further is useful when employing a multispindle drilling machine, the drilling spindles of which are numbered in the same manner as the holes 7'.

It will be apparent from the above discussion that it is contemplated that the templates 2–4 be formed of a transparent material, for example plexiglass. However, this is not absolutely necessary.

Although the present invention has been described and illustrated with respect to preferred features thereof, it is to be understood that various modifications and changes may be made to the specifically described and illustrated features without departing from the scope of the present invention.

I claim:

1. A marking gauge for use in setting positions of machine stops for boring and cutting machinery employed for manufacturing components of articles of furniture and for use in locating positions of attachment of furniture fittings on articles of furniture, said marking gauge comprising:

an elongated ruler to be located at a position representative of a component of an article of furniture onto which is to be mounted at least one furniture fitting, said ruler having therealong at least one scale, and said ruler having therethrough a series of marking holes spaced at predetermined equal intervals along said ruler and at least one series of mounting holes;

plural templates representative of respective furniture fittings;

means for adjustably mounting said templates at respective predetermined different locations along said ruler, said mounting means extending from respective said templates into selected said mounting holes; and said templates having means for, when said templates are mounted at selected said predetermined locations, determining positions indicative of a predetermined construction pattern of a component of the article of furniture, said determining means comprising at least one hole in each said template at a position to be aligned with a respective said marking hole when said each template is mounted at a respective selected said predetermined location along said ruler, wherein the thus aligned said template holes and said marking holes indicate said positions indicative of said predetermined construction pattern of the component of the article of furniture.

2. A gauge as claimed in claim 1, wherein said ruler has therealong adjacent metric and English scales.

3. A gauge as claimed in claim 1, wherein said series of marking holes in said ruler are positioned centrally of opposite edges thereof, and comprising two said series of mounting holes located on opposite sides of said marking holes.

4. A gauge as claimed in claim 1, wherein said mounting holes are spaced at said predetermined equal intervals along said ruler and are offset with respect to said marking holes.

5. A gauge as claimed in claim 4, wherein said mounting holes are positioned midway between adjacent said marking holes in the longitudinal direction of said ruler.

6. A gauge as claimed in claim 1, wherein said mounting means comprise plural fixing pins insertable through said templates into selected said mounting holes.

7. A gauge as claimed in claim 6, wherein each said template is substantially rectangular and has therethrough at least two holes through which extend said pins into respective said mounting holes in said ruler.

8. A gauge as claimed in claim 1, wherein each said aligned template and the respective said marking hole indicate the position of a hole to be drilled for mounting the respective furniture fitting.

9. A gauge as claimed in claim 1, wherein said marking holes in said ruler are numbered consecutively from one end of said ruler to the other.

10. A gauge as claimed in claim 1, wherein at least one said template has therein at least one slot located at a position indicative of a portion of a respective fitting.

11. A gauge as claimed in claim 10, wherein said at least one template is representative of the position of an end of a drawer supporting rail, and said slot is indicative of the position of the bottom of a drawer to be supported by the supporting rail.

12. A gauge as claimed in claim 1, wherein at least one said template has in at least one edge thereof a recess located at a position indicative of a portion of a respective fitting.

13. A gauge as claimed in claim 1, wherein said ruler has thereon at least one longitudinally extending marking strip capable of receiving thereon markings.

14. A gauge as claimed in claim 13, wherein each said template has therethrough at least one slot or recess located at a position indicative of a portion of a respective fitting and located above said marking strip.

15. A gauge as claimed in claim 1, wherein said templates are formed of a transparent material.

16. A gauge as claimed in claim 15, wherein each said template has formed thereon an outline of the respective fitting.

17. A gauge as claimed in claim 1, wherein each said template has extending therefrom an edge flange guided along a respective edge of said ruler.

18. A gauge as claimed in claim 1, wherein a first end of said ruler is defined by two parallel surfaces which are offset longitudinally of said ruler by a step.

* * * * *